(12) United States Patent
Oleynik et al.

(10) Patent No.: US 8,294,287 B2
(45) Date of Patent: Oct. 23, 2012

(54) ELECTRICAL POWER GENERATOR

(75) Inventors: Vladislav Oleynik, Pittsboro, NC (US); Melvin Jason Ezell, Buies Creek, NC (US); Jeffrey L. Riggs, Pittsboro, NC (US); Gennadiy Albul, Pittsboro, NC (US)

(73) Assignee: Causwave, Inc., Pittsboro, NC (US)

( * ) Notice: Subject to any disclaimer, the term of this patent is extended or adjusted under 35 U.S.C. 154(b) by 383 days.

(21) Appl. No.: 12/611,680

(22) Filed: Nov. 3, 2009

(65) Prior Publication Data
US 2010/0109342 A1 May 6, 2010

Related U.S. Application Data

(60) Provisional application No. 61/110,737, filed on Nov. 3, 2008, provisional application No. 61/170,869, filed on Apr. 20, 2008.

(51) Int. Cl.
*F03G 7/00* (2006.01)
(52) U.S. Cl. .................................................. 290/1 R
(58) Field of Classification Search ................... 290/1 R; 310/11
See application file for complete search history.

(56) References Cited

U.S. PATENT DOCUMENTS

| | | |
|---|---|---|
| 421,306 A | 2/1890 | Reynolds |
| 2,753,801 A | 7/1956 | Cummings |
| 2,879,955 A | 3/1959 | Von Zborowski |
| 2,927,398 A | 3/1960 | Kaye et al. |
| 2,960,033 A | 11/1960 | Jackson |
| 3,031,932 A | 5/1962 | Fite, Jr. |
| 3,049,832 A | 8/1962 | Joffe |
| 3,082,666 A | 3/1963 | Fitzpatrick et al. |
| 3,127,528 A * | 3/1964 | Lary et al. ........... 310/11 |
| 3,135,163 A | 6/1964 | Mechlin, Jr. et al. |
| 3,158,100 A | 11/1964 | Finley |
| 3,167,016 A | 1/1965 | Czerwinski et al. |
| 3,198,073 A | 8/1965 | Van Tine et al. |
| 3,252,281 A | 5/1966 | Everett et al. |
| 3,253,511 A | 5/1966 | Zwicky |
| 3,313,207 A | 4/1967 | Biehl et al. |
| 3,323,531 A | 6/1967 | Spellman |
| 3,353,823 A | 11/1967 | Sobel |
| 3,369,455 A | 2/1968 | Jones |
| 3,397,638 A | 8/1968 | Gould |
| 3,422,808 A | 1/1969 | Weinberg et al. |
| 3,428,022 A | 2/1969 | Ledley |
| 3,450,904 A * | 6/1969 | Bidard ................ 310/11 |

(Continued)

FOREIGN PATENT DOCUMENTS

EP 282681 A * 9/1988

(Continued)

OTHER PUBLICATIONS

International Search Report; Jun. 16, 2010; issued in International Patent Application No. PCT/US09/63173.

(Continued)

*Primary Examiner* — Joseph Waks
(74) *Attorney, Agent, or Firm* — Nelson Mullins Riley & Scarborough LLP; R. Brian Drozd

(57) ABSTRACT

Systems and methods are disclosed relating to a system including a launch tube and a generator connected with the launch tube. The generator uses multiphase materials (MPM) and compressed air to convert kinetic energy of the MPM into electrical energy.

21 Claims, 8 Drawing Sheets

U.S. PATENT DOCUMENTS

| | | | |
|---|---|---|---|
| 3,620,123 A | 11/1971 | Per-Olof Davidsson et al. | |
| 3,633,560 A | 1/1972 | DeFreitas | |
| 3,715,983 A | 2/1973 | Rosinski | |
| 3,842,598 A | 10/1974 | Forsten | |
| 3,859,789 A * | 1/1975 | Fawcett et al. | 60/325 |
| 3,878,410 A * | 4/1975 | Petrick et al. | 310/11 |
| 3,916,794 A | 11/1975 | Mayer | |
| 3,927,329 A * | 12/1975 | Fawcett et al. | 290/1 R |
| 4,185,538 A | 1/1980 | Barakauskas | |
| 4,333,402 A | 6/1982 | Landstrom et al. | |
| 4,444,085 A | 4/1984 | Dragonuk | |
| 4,455,917 A | 6/1984 | Shook | |
| 4,584,925 A | 4/1986 | Culotta et al. | |
| 4,597,203 A * | 7/1986 | Middleton | 37/241 |
| 4,682,559 A | 7/1987 | Schnitzer et al. | |
| 4,784,035 A | 11/1988 | Fishfader et al. | |
| 4,932,306 A | 6/1990 | Rom | |
| 5,015,211 A | 5/1991 | Reveen | |
| 5,063,826 A | 11/1991 | Bulman | |
| 5,081,862 A | 1/1992 | Merten, Jr. | |
| 5,097,743 A | 3/1992 | Hertzberg et al. | |
| 5,099,645 A | 3/1992 | Shuler et al. | |
| 5,149,290 A | 9/1992 | Reveen | |
| 5,170,005 A | 12/1992 | Mabry et al. | |
| 5,174,384 A | 12/1992 | Herman | |
| 5,355,764 A | 10/1994 | Marinos et al. | |
| 5,584,736 A | 12/1996 | Salvemini | |
| 5,623,113 A | 4/1997 | Valembois | |
| 5,833,393 A | 11/1998 | Carnahan et al. | |
| 5,847,307 A | 12/1998 | Kennedy et al. | |
| 5,864,517 A | 1/1999 | Hinkey et al. | |
| 5,927,329 A | 7/1999 | Yie | |
| 5,964,985 A | 10/1999 | Wootten | |
| 5,993,921 A | 11/1999 | Hunn | |
| 6,029,453 A * | 2/2000 | Mendive | 60/641.2 |
| 6,124,563 A | 9/2000 | Witherspoon et al. | |
| 6,138,766 A | 10/2000 | Finnerty et al. | |
| 6,142,055 A | 11/2000 | Borgwarth et al. | |
| 6,225,705 B1 | 5/2001 | Nakamats | |
| 6,257,340 B1 | 7/2001 | Vician | |
| 6,276,354 B1 | 8/2001 | Dillon | |
| 6,352,030 B1 | 3/2002 | Doll et al. | |
| 6,427,574 B1 | 8/2002 | Callahan | |
| 6,550,074 B1 | 4/2003 | Allenbaugh et al. | |
| 6,752,060 B1 | 6/2004 | Griffin | |
| 6,982,501 B1 * | 1/2006 | Kotha et al. | 310/11 |
| 7,061,129 B2 * | 6/2006 | Perlo et al. | 290/1 R |
| 7,105,935 B2 * | 9/2006 | Hsu | 290/2 |
| 7,182,014 B2 | 2/2007 | Smith | |
| 7,267,230 B1 | 9/2007 | Smith | |
| 7,313,881 B1 | 1/2008 | Gieseke et al. | |
| 7,317,662 B2 | 1/2008 | Unsworth et al. | |
| 7,617,818 B1 | 11/2009 | Turchik et al. | |
| 7,637,203 B2 | 12/2009 | Moss | |
| 7,685,920 B2 | 3/2010 | Paul | |
| 7,755,008 B2 * | 7/2010 | Tsai | 219/628 |
| 7,775,148 B1 | 8/2010 | McDermott | |
| 2001/0032638 A1 | 10/2001 | Yoshimura | |
| 2002/0096041 A1 | 7/2002 | Briggs et al. | |
| 2004/0007123 A1 | 1/2004 | Ritchie et al. | |
| 2004/0074381 A1 | 4/2004 | Smith | |
| 2004/0182099 A1* | 9/2004 | Hsu | 62/259.2 |
| 2005/0139363 A1 | 6/2005 | Thomas | |
| 2006/0090635 A1 | 5/2006 | Paul | |
| 2006/0096449 A1 | 5/2006 | Williams et al. | |
| 2006/0225716 A1 | 10/2006 | Lapointe | |
| 2007/0144506 A1 | 6/2007 | Sun et al. | |
| 2007/0251120 A1 | 11/2007 | Connell | |
| 2009/0255432 A1 | 10/2009 | Zhang et al. | |

FOREIGN PATENT DOCUMENTS

| | | | |
|---|---|---|---|
| EP | 0559547 | A1 | 9/1993 |
| GB | 2058302 | A | 4/1981 |
| JP | 07231643 | A * | 8/1995 |
| JP | 2000-130991 | A | 5/2000 |
| JP | 2002316067 | A | 10/2002 |
| JP | 2004274942 | A | 9/2004 |
| KR | 100772493 | B1 | 11/2007 |
| RU | 397794 | A | 2/1974 |
| RU | 2063572 | C1 | 7/1996 |
| RU | 2084260 | C1 | 7/1997 |

OTHER PUBLICATIONS

Written Opinion of the International Searching Authority; Jun. 16, 2010; issued in International Patent Application No. PCT/US09/63173.

Alfer'Ev, K.V. et al., Mechanics of Autonomous Gas-Dynamic Torpedo Motion in Loose Medium, Journal of Mining Science, 2002, pp. 324-328, vol. 38, No. 4.

Borovikov, V.V., Development of a Containment Cavity in a Layer of Free-Flowing Material in Gaseodynamic Outburst from a Subsurface Gas Source, Journal of Mining Science, 1997, pp. 41-46, vol. 33, No. 1.

Borovikov, V.V. et al., Dynamics of a Soil Mass Subjected to a Deep Source of Gaseous Energy, Journal of Mining Science, 1995, pp. 51-55, vol. 31, No. 1.

Alfer'Ev, K.V. et al.; The Effect of Rigid Boundaries on the Directionality of an Excavating Explosion; Combustion, Exposion, and Shock Waves; 2001; pp. 613-615; vol. 37, No. 5.

Borovikov, V.V. et al., Analysis of Energy Expenditures of Cold Gas on Ejection, Journal of Mining Science, 1995, pp. 364-365, vol. 31, No. 5.

Borovikov, V.V., Numerical Modeling of Gaseodynamic Processes in the Atmosphere Occurring with Detonation of a Vertical Deep-Hole Charge, Journal of Mining Science, 1995, pp. 427-432, vol. 31, No. 6.

Borovikov, V.V., Evaluation of Intensity of Loading in a Massif of Loose Material in the Zone of Action of an Underground Gaseodynamic Discharge, Journal of Mining Science, 1995, pp. 416-420, vol. 31, No. 6.

Borovikov, V.V., Numerical Modeling of the Magnitude of the Load on a Mass of Free-Flowing Material Subjected to the Action of a Gaseodynamic Source, Journal of Mining Science, 1997, pp. 348-355, vol. 33, No. 4.

Borovikov, V.V., Numerical Studies of Transportation of Granular Material by a Pin-Point Blast Using Models of the Mechanics of Continuous and Granular Media, Journal of Applied Mechanics and Technical Physics, 1998, pp. 1-11, vol. 39, No. 1.

Borovikov, V.V. et al., Gas-Dynamic Method of Decreasing the Force of Penetration of a Solid Into Ground, Journal of Applied Mechanics and Technical Physics, 1999, pp. 531-534, vol. 4, No. 3.

Borovikov, V.V. et al., Efficiency of Pulse Gas-Dynamic Technique of Pneumatic Transportation of Friable Materials, Journal of Mining Science, 1996, pp. 54-57, vol. 32, No. 1.

Borovikov, V.V et al.; The Use of Wave Effects of Pinpoint Underground Explosion; Combustion, Explosion, and Shock Waves; 2000; pp. 414-416; vol. 36, No. 3.

International Preliminary Report on Patentability; Dec. 16, 2010; issued in International Patent Application No. PCT/US2009/045936.

V.P. Korobeinikov (Propagation of shock and detonation waves in dust-laden gases, Journal: Fluid Dynamics, Publisher: MAIK Nauka/Interperiodica distributed exclusively by Springer Science+Business Media, LLC., ISSN: 0015-4628 1573-8507 (Online); Issue vol. 19, No. 6/Nov. 1984; pp. 938-943.

International Search Report and Written Opinion, issued Jun. 27, 2011, for PCT/US2010/055295, Korean International Search Authority.

* cited by examiner

ELECTRICAL POWER GENERATOR

CROSS-REFERENCE TO RELATED APPLICATION

This application claims priority from provisional patent application having Ser. No. 61/110,737 filed Nov. 3, 2008 and provisional patent applications having Ser. No. 61/170,869 filed Apr. 20, 2008, the entire disclosure of which is incorporated herein by reference.

BACKGROUND

Embodiments of the present disclosure relate to a system for generating electricity.

Currently, there are various systems for generating electricity. Such systems have generally proven to be unsatisfactory in operation due to the gross inefficiency and are also environmentally unfriendly.

Thus, there is a need to develop systems and methods to generate electricity efficiently, effectively and in an environmentally-safe manner.

BRIEF SUMMARY

In accordance with an embodiment of the present disclosure, a system includes a launch tube and a generator connected with the launch tube. The generator uses multiphase materials (MPM) and compressed air to convert kinetic energy of the MPM into electrical energy.

In accordance with another embodiment of the present disclosure, a system includes a launch tube and a generator connected with the launch tube. The generator uses multiphase materials (MPM) and compressed air to convert kinetic energy of the MPM into electrical energy. The generator includes secondary coils that generate electrical power when the MPM travels proximate to the secondary coils.

In accordance with yet another embodiment of the present disclosure, a method of generating electrical energy includes filling a launch tube with multiphase material (MPM), with the launch tube connected to a generator. The method further includes presenting compressed air into the launch tube to launch the MPM out of the launch tube into the generator, the generator converting kinetic energy into electrical energy.

Other aspects and features of the present disclosure, as defined solely by the claims, will become apparent to those ordinarily skilled in the art upon review of the following non-limited detailed description of the disclosure in conjunction with the accompanying figures.

DETAILED DESCRIPTION

The following detailed description of embodiments refers to the accompanying drawings, which illustrate specific embodiments of the disclosure. Other embodiments having different structures and operations do not depart from the scope of the present disclosure.

Various embodiments of the system may be employed. For example, a generator system employing multiphase materials (MPM) may be used.

Figure 1A:
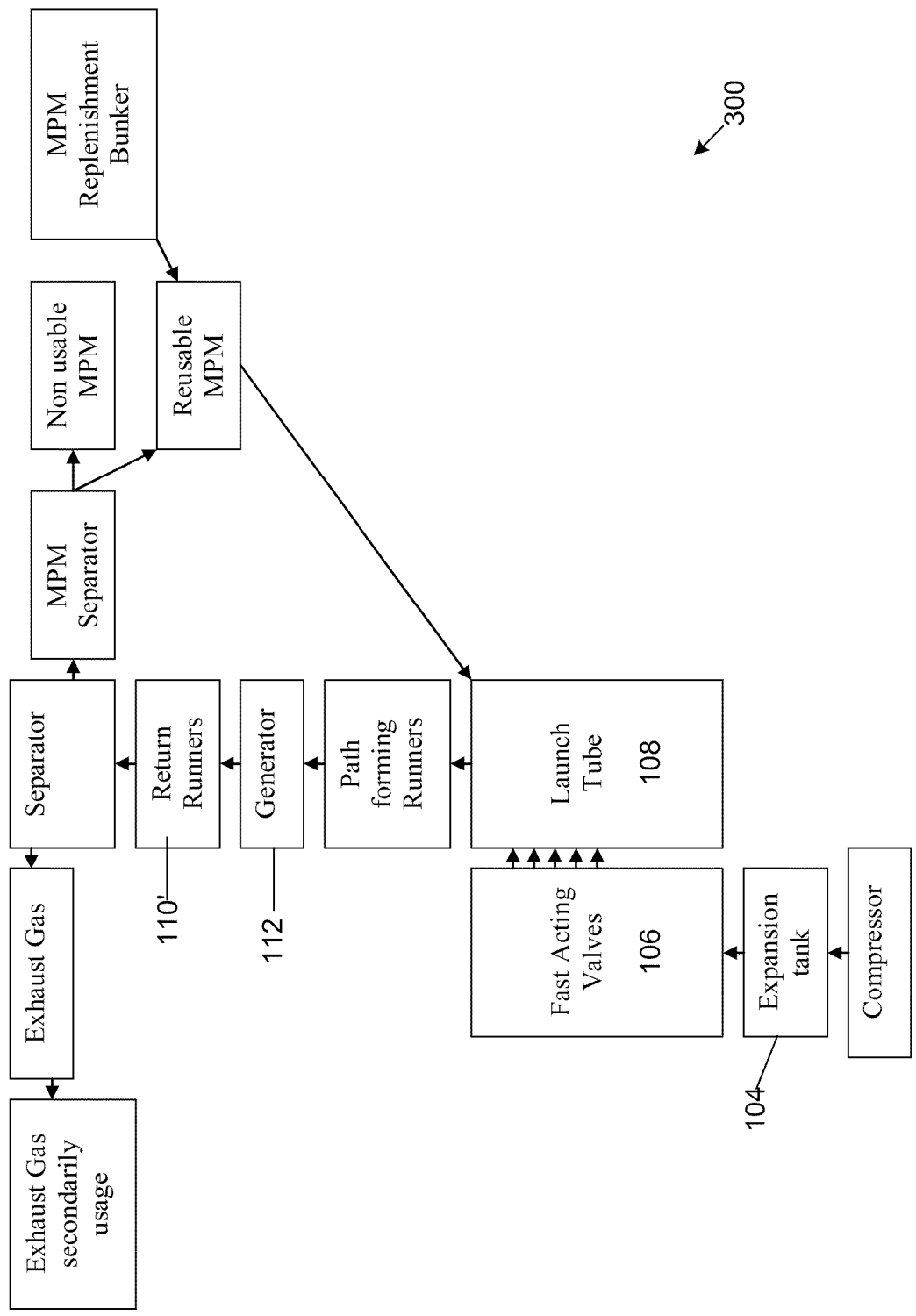
FIG. 1A is an example of a block diagram of a generator system in accordance with some aspects.
Figure 1B:
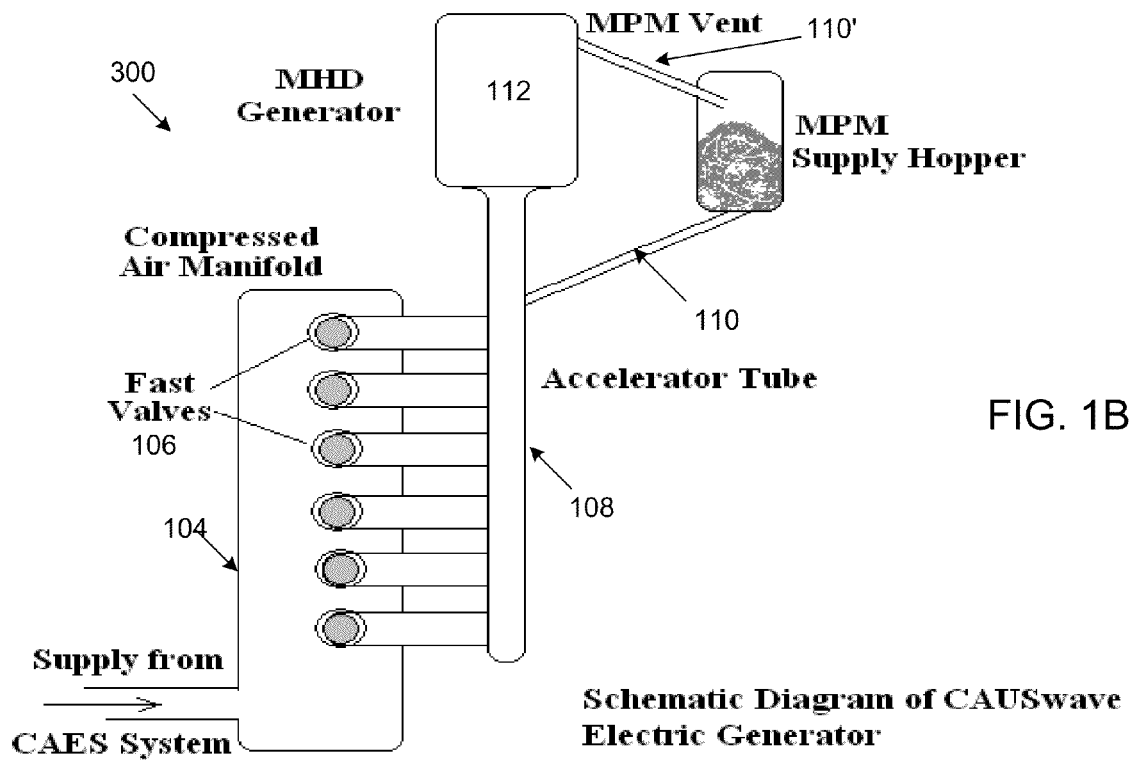
FIG. 1B is an example of a generator system in accordance with some aspects.
Figure 1C:
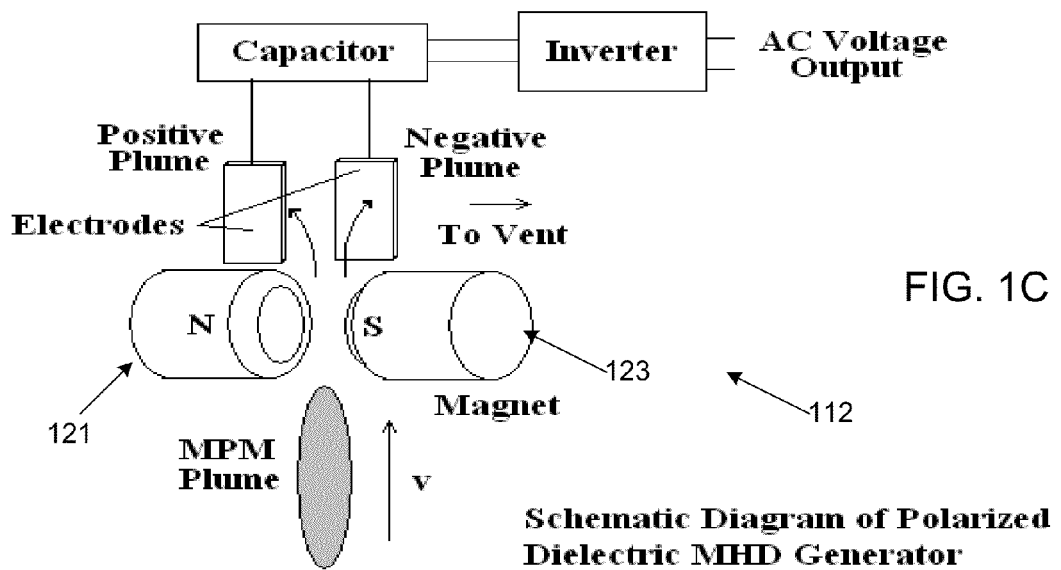
FIGS. 1C-1D are examples of a generator in accordance with some aspects.
Figure 1D:
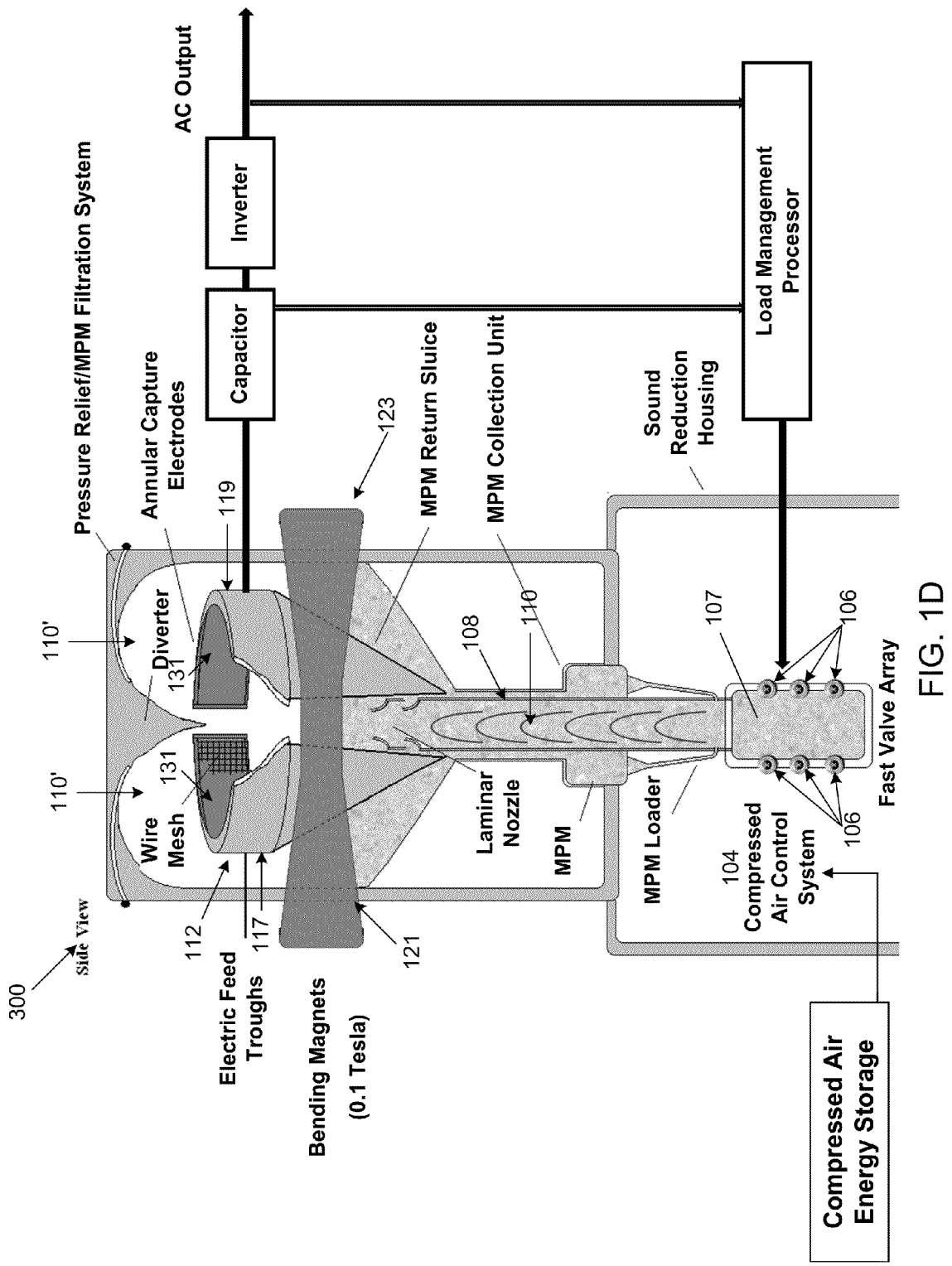

FIG. 1A is a block diagram of an example of a generator system 300 in accordance with some embodiments of the present invention. The system 300 may include one or more of the components described herein or may include more than the disclosed components. The exemplary system 300 includes an air compressor 102, a storage tank 104, fast acting valves 106, a launch tube 108, multiphase material (MPM) runners 110, 110', and an electric generator 112. In some embodiments the system 300 may include circuitry, such as a power controller, a digital controller, a driving computer, a control interface for the driving computer, and any other circuitry to control operation of the system 300.

As a general overview of the energy process, according to some embodiments, MPM 107 is filled into launch tube 108. Compressed air, which is stored in a storage tank 104, is rapidly introduced into the launch tube 108 via the fast acting valves 106. The air creates a shockwave, as soon as the MPM 107 begins to move the shockwave will be created which propagates up, along with the MPM 107, out from the base of the launch tube 108, and a depression wave is created which moves in the opposite direction, in the launch tube 108 causing the MPM 107 to rapidly move through the launch tube 108 toward the generator 112. Electrical energy is captured by the generator 112 and transferred to electronic circuitry. After the MPM 107 has moved through the generator 112 or out of the generator 112, the MPM 107 is returned to a MPM reservoir or the MPM that is unusable is discarded. This above-described process overview is an example of a process of the present invention and it should be noted that various other steps and alternate steps may be included in this process. Below is a more detailed description of several aspects of the present invention.

A discussion of the parts of the generator system in some embodiments will now be discussed below with regard to FIGS. 1A-1G Any kind of air compressor 102 may be employed in the system. In one embodiment it could be a piston compressor and in another it could be a screw type of compressor. The air compressor 102 stores gases in the storage tank 104 and pressurizes such storage tank 104 until the gas is ready to be delivered to the launch tube 108. In one embodiment, the air compressor 102 shall be mounted in the vehicle since it is an on board compressor, and thus, the air compressor 102 should be lightweight and high performance. The air compressor 102 is communicative with electrical circuitry and the storage tank 104.

The storage tank 104 stores the compressed air and is communicative with electrical circuitry and the fast-acting valves 106. The storage tank 104 may be manufactured from composite materials to maintain light weight and durability. To prevent the possibility of the storage tank exploding in case of impact, the construction of the tank is configured to slowly relieve the pressure, rather than relieving the pressure at once and thus exploding.

The fast acting valves 106 receive compressed air from the storage tank 104 and act as a distributor to distribute compressed air into the generator 112 on a timed cycle. The operation of the fast acting valves 106 occurs rapidly to activate the MPM 107. For each timed cycle, the fast acting valves release compressed air into the cavity (equivalently the launch tube) holding the MPM. The release is sequential proceeding from the nozzle-end back toward the base of the cavity. The sequence is timed to hold the MPM beneath the acting valve in place. As the sequence proceeds toward the base of the cavity, the MPM above the acting valve is projected up through the nozzle carrying the kinetic energy that has been converted from the potential energy of the compressed air.

The releasing of air pressure into the launch tube 108 from the compressor 102 creates a shockwave throughout the launch tube and therefore MPM will be forced upwards out of the launch tube toward the generator 112 in a rapid fashion and a depression wave will be created. As the MPM travels up the launch tube, electrostatic energy is converted from the kinetic energy of the moving MPM which is eventually captured by the generator (as is discussed later).

Figure 1E:
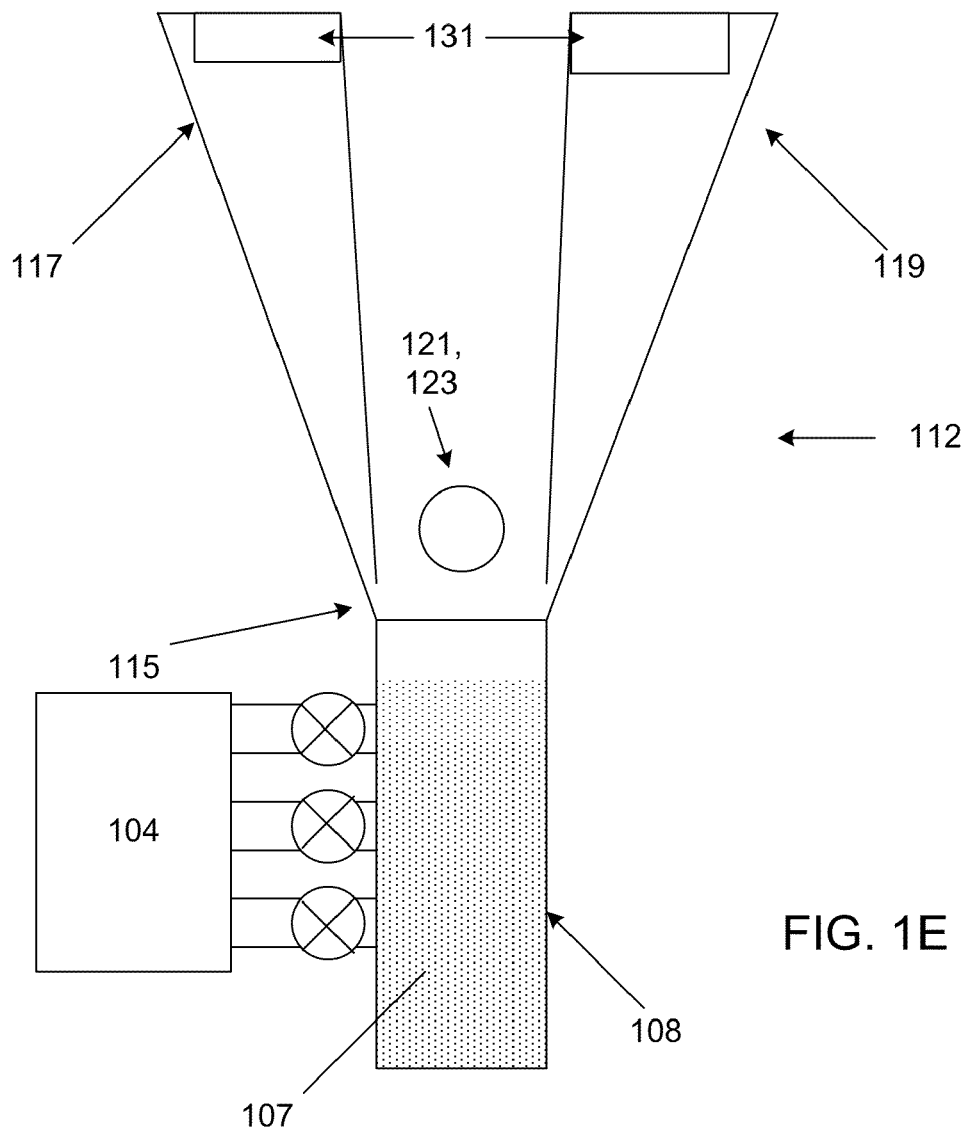
FIG. 1E is an example of a generator in accordance with some aspects.

An exemplary launch tube 108 that may be employed in the present invention is described in pending U.S. patent application Ser. No. 12/476,555, which is incorporated herein in its entirety by reference. As shown in FIG. 1E, the launch tube 108 may be any container which is capable of receiving and holding material (e.g. MPM) and capable of being pressurized. The launch tube 108 may be of any shape or size. For example, the launch tube 108 may be a cylindrical shape. At least a portion of the launch tube 108 is initially hollow. Any type of materials make up the body of the launch tube, including metals (e.g. steel, aluminum, etc.), plastic (e.g. PVC) and the like. In one embodiment, the launch tube 108 is a hollow pipe or a plastic tube. The launch tube 108 has at least one opening 108 to receive MPM and/or pressurized air/gas. For example, the launch tube 108 may have multiple openings to receive pressurized gas via the fast acting valves and the launch tube 108 may also have other openings to receive MPM 107, such as MPM from a reservoir and/or MPM which has been used and which is being returned to the launch tube 108 (via, for example, a valve).

Figure 1F:
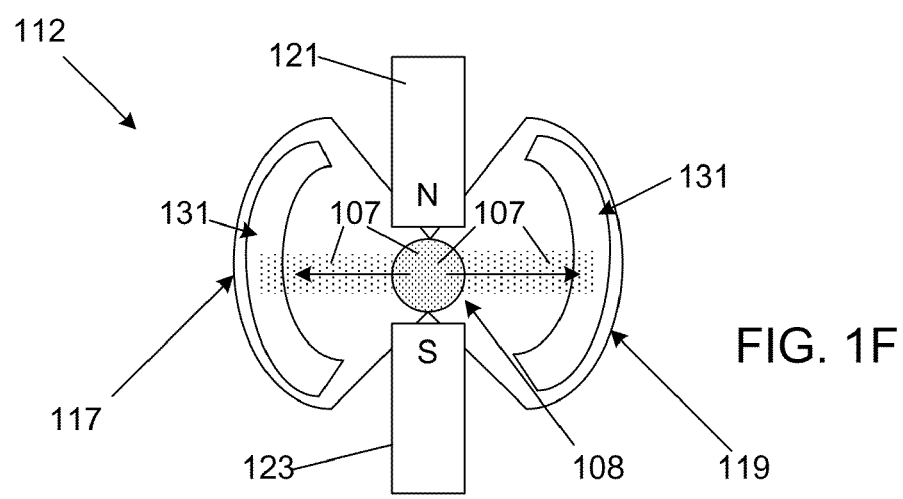
FIG. 1F is a top view of the generator of FIG. 1E in accordance with some aspects.
Figure 1G:
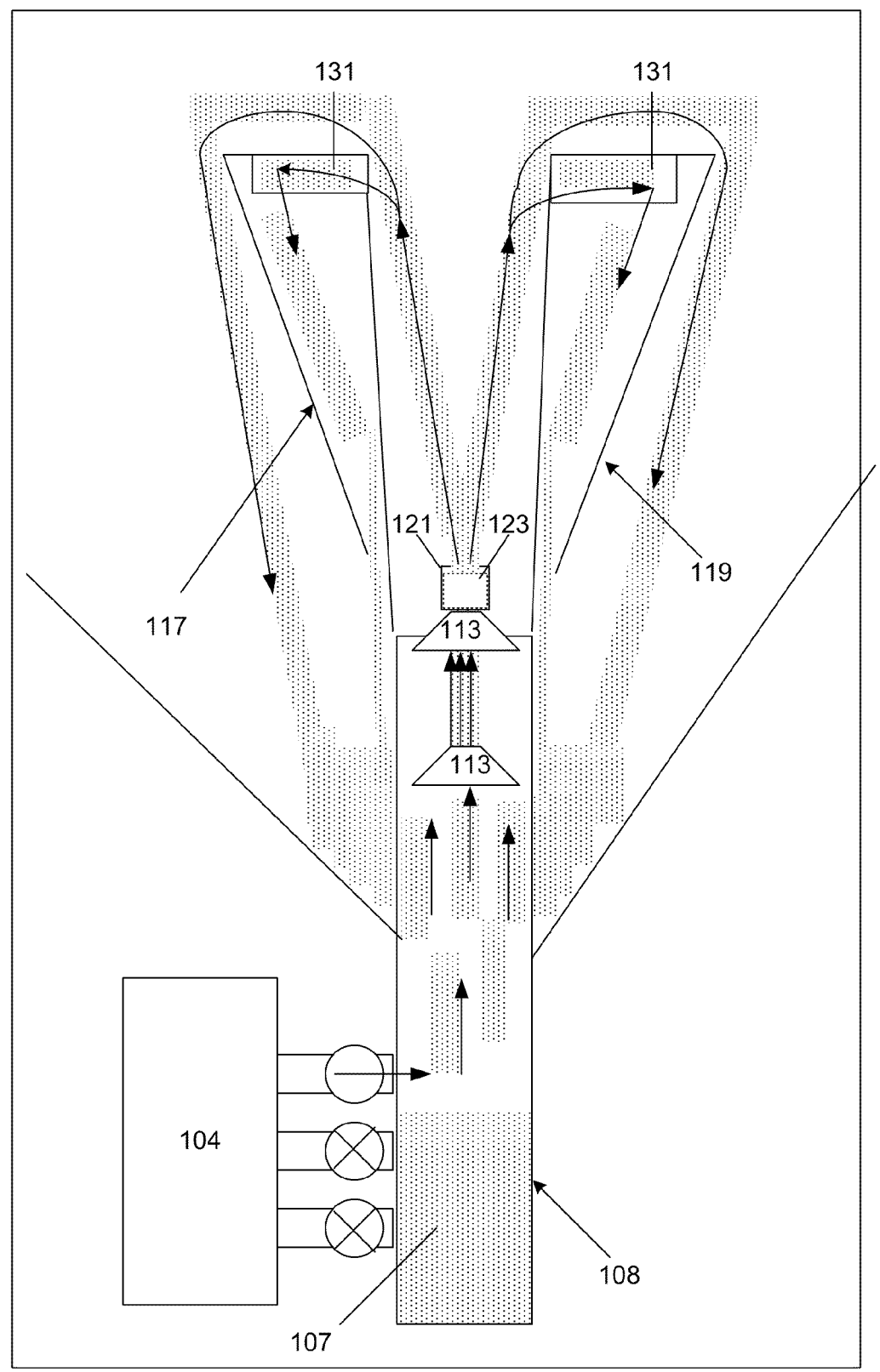
FIG. 1G is an example of a generator in operation in accordance with some aspects

The launch tube 108 may include a uniform flow system for creating a uniform flow of MPM 107. Such uniform flow system is located within the launch tube and creates a uniform laminar flow of MPM when the MPM reaches the generator 112. The system can be any apparatus system, such a series of diffusers and effusers 113, as shown in FIG. 1G. These diffusers and effusers 113 create a Venturi effect on the MPM flow thereby causing the MPM to uniformly flow into the generator 112. In one embodiment, such effuser has a first opening and a second opening and a generally conical shape, whereby the surface area of the first opening and the surface area of the second opening are equivalent. This effuser guides the MPM through a magnetic field area created between two adjacent magnets according to various embodiment discussed in more depth later with regards to detailed descriptions of exemplary generators which may be employed.

The diffusers and effusers 113 direct the flow of MPM in such a way as to minimize the corrosive effect of MPM impacting the inner walls of the generator. The diffusers and effusers also decrease the turbulence and create a uniform laminar flow around the internal structures of the generator. The diffusers and effusers also decrease or eliminate the grouping effect of the MPM and focus the MPM in the central portion of the launch tube 108.

In some embodiments, the MPM 107 is any material having a multiphased composite structure (e.g., dielectric materials combined with gases, solids and/or gases and/or fluids, etc.). An example of such MPM includes a sand and gas mixture. Other examples of MPM materials include quartz, plastics, and the like mixed with materials having at least one different phase. In one embodiment, MPM includes any material which has a multiplicity of elements bonded together such that when such bond is broken energy is released. The MPM has porosity greater than 0 but less than or equal to 1. At least a portion or all of an interior cavity of the launch tube 108 is filled with MPM.

In another embodiment, the MPM has other properties such as adsorption. In the presence of such properties, a breakage of the bond will occur on the material's surface only, but the mechanical structures could be intact and material would be used for a long time without replacement.

As shown in FIGS. 1E and 1G, after MPM is placed in the launch tube 108 from the supply hopper or other source, the fast acting valves operate in a timed sequence using the compressed air from the storage tank 104. The sequential introduction of the compressed air generates a shock wave and in the opposite direction the depression wave, that imparts kinetic energy to the MPM material forcing the MPM through the launch tube at a rapid pace.

The runners 110, 110' are connected to the generator 112. The runners include a first set of runners 110 and a return set of runners 110'. These runners carry the MPM to and from the generator. The first set of runners 110 may be installed at the end of the launch tube 108, but before entrance to the generator 112. As previously discussed, compressed air forces the MPM through the launch tube and to the generator. For the return set of runners 110', these runners are installed after the generator onto the return path to the MPM supply hopper. The return runners form a return path after the MPM has traveled through the generator. The return runners 110' separate MPM and air, where the separated air is exhausted out of the system and the MPM is collected for next cycle.

The generator 112 may be any device which generates electrical energy based on MPM traveling through the generator 112. Various embodiments of the generator 112 will now be described. Three exemplary embodiments of such generator system may be employed and are described herein:

1) A magneto-hydrodynamic generator employing a permanent or temporary magnet and dielectric MPM;
2) a generator employing coils and magnetically soft MPM; and
3) a generator employing coils and permanently magnetic MPM.

It should be understood that various other embodiments of generator systems using MPM are well within the scope of the present disclosure. Each of these systems is described below. It should be noted that examples of an electric generator that may be employed in the present invention is described in U.S. Provisional Patent Application No. 61/110,737 and 61/170,869, which are both incorporated in their entirety herein by reference.

Figure 3:
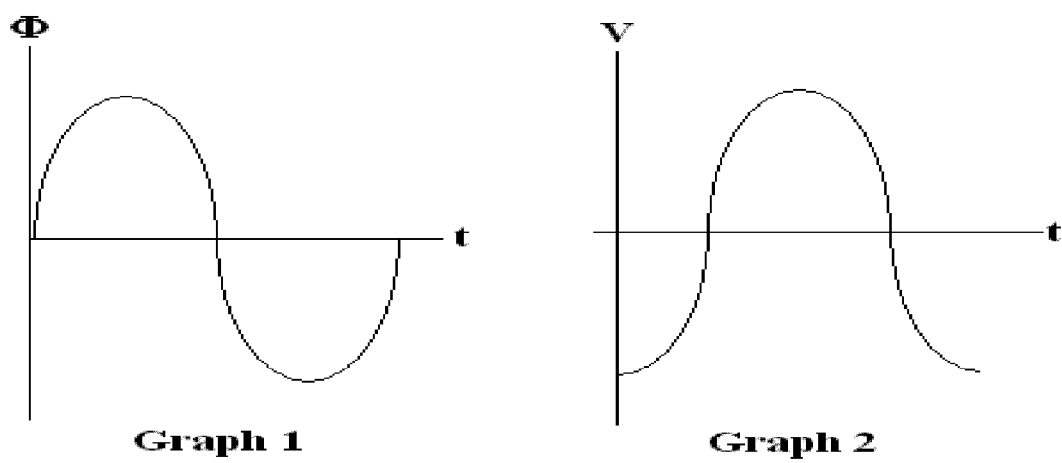
FIG. 3 is a graph of signals generated by the generator of FIG. 4A.

Magneto-hydrodynamic Generator Employing a Permanent or Temporary Magnet and Dielectric MPM According to one embodiment, the electric generator system 300 may include two opposing portions 117, 119. The base 115 of the electric generator is attached to the end of the launch tube 108 and the two opposing portions extend conically outwards from the generator base. The generator also includes two magnets (i.e., a north pole 121 and a south pole 123), as illustrated best in FIGS. 3C, 3E and 3F. These magnets 121, 123 may be two separate magnets or opposing ends of a single magnet. Regardless, these magnets 121, 123 are positioned at the base of the generator 112 and directly above the end of the launch tube 108. The uniform flow of MPM travels between the two magnets 121, 123 such that the MPM is exposed to magnetic field. This causes the MPM to split into two directions perpendicular to the direction of the magnetic field, as illustrated in FIG. 1F.

As a general overview, the electric generator 112 converts electrostatic energy and/or kinetic energy of the moving MPM into electric energy when the MPM is released from the launch tube. To do this, the generator 112 includes a mesh and an electrode (collectively shown as element 131) at the end of each of the two opposing portions 117, as illustrated in FIG. 1E. As the electro-charged MPM passes proximate to the mesh and electrodes 131, the MPM is attracted into the mesh and the ionized electrodes pass into the electrode which is then passed to electrical circuitry. The electrostatic energy is then released from the MPM and then the used MPM is then returned to a MPM supply hopper for reuse. Thus, electrical power is generated from applying pressurized gas to MPM in the launch tube.

As previously discussed, the MPM may consist of a fine grain dielectric material that due to its insulative properties will develop an electric charge as it is fired from the launch tube, as discussed above. In this manner, the uniform flow system (e.g., a series of interlocking nozzles) direct the MPM in such a way as to optimize the conversion of MPM kinetic energy to DC charge by increasing dramatically the ionization of the dielectric MPM material. Furthermore, as previously discussed, the uniform flow system is designed to direct the flow of MPM in such a way as to minimize the corrosive effect of MPM impacting the inner walls of the generator. Depending upon the electronegativity of the material, this uniform flow system will cause a sizable fraction of the MPM to develop a positive charge while an equal fraction will be negatively charged.

As shown in FIGS. 1C-1G, a "plume" of charged MPM enters the magnetic field provided by a magnet, such as a strong Neodymium rare earth magnet. The particles experience a force described by the following Lorentz Equation, $$\vec{F} = q \vec{v} \times \vec{B}$$

Here q is the charge, $\vec{v}$ is the velocity vector, and $\vec{B}$ is the magnetic field vector. This force steers positive and negative charges in opposite directions to where they are collected by electrodes placed at right angles to the field and velocity vectors. The surface charge density $\sigma$ produced by this force yields an electrical potential given by $$V = \frac{2\sigma d}{\varepsilon_0}$$

where d is the electrode separation and $\varepsilon_0$ is the permittivity of free space, a constant that yields electric field strength. As this electric field builds in intensity, the charged MPM slows, effectively converting its kinetic energy into electrical energy that is stored in the capacitor shown. This energy, once conditioned by the regulator is then used to power the vehicle motor and electronics as with the previous generator.
Generator Employing Coils and Magnetically Soft MPM As previously mentioned, the generator 112 previously described is not the only generator that may be employed to generate electrical energy. Indeed, various other generator systems may be employed.

An alternate generator system 400 that may be used in place of the above-described generator 112 is now described. The now-described generator system employs temporarily magnetic MPM. Such temporarily magnetic MPM consists of ferromagnetic material with a high magnetic susceptibility but low retentivity, such as a "soft" iron alloy (e.g., "soft" iron, or other material which can be magnetized using an electromagnet).

The temporarily magnetic MPM is placed in a launch tube and launched out of the launch tube. The temporarily magnetic MPM is called a "plume" of temporarily magnetic MPM.

Figure 2A:
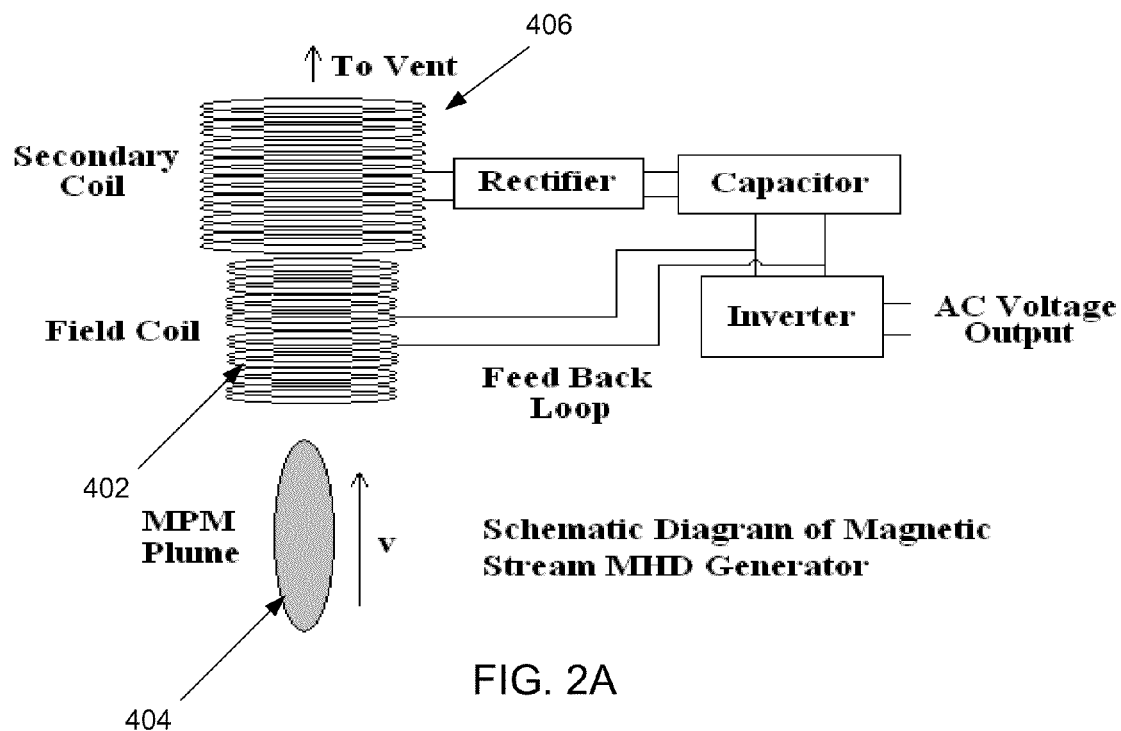
FIGS. 2A and 2B illustrate other examples of generators in accordance with some aspects.
Figure 2B:
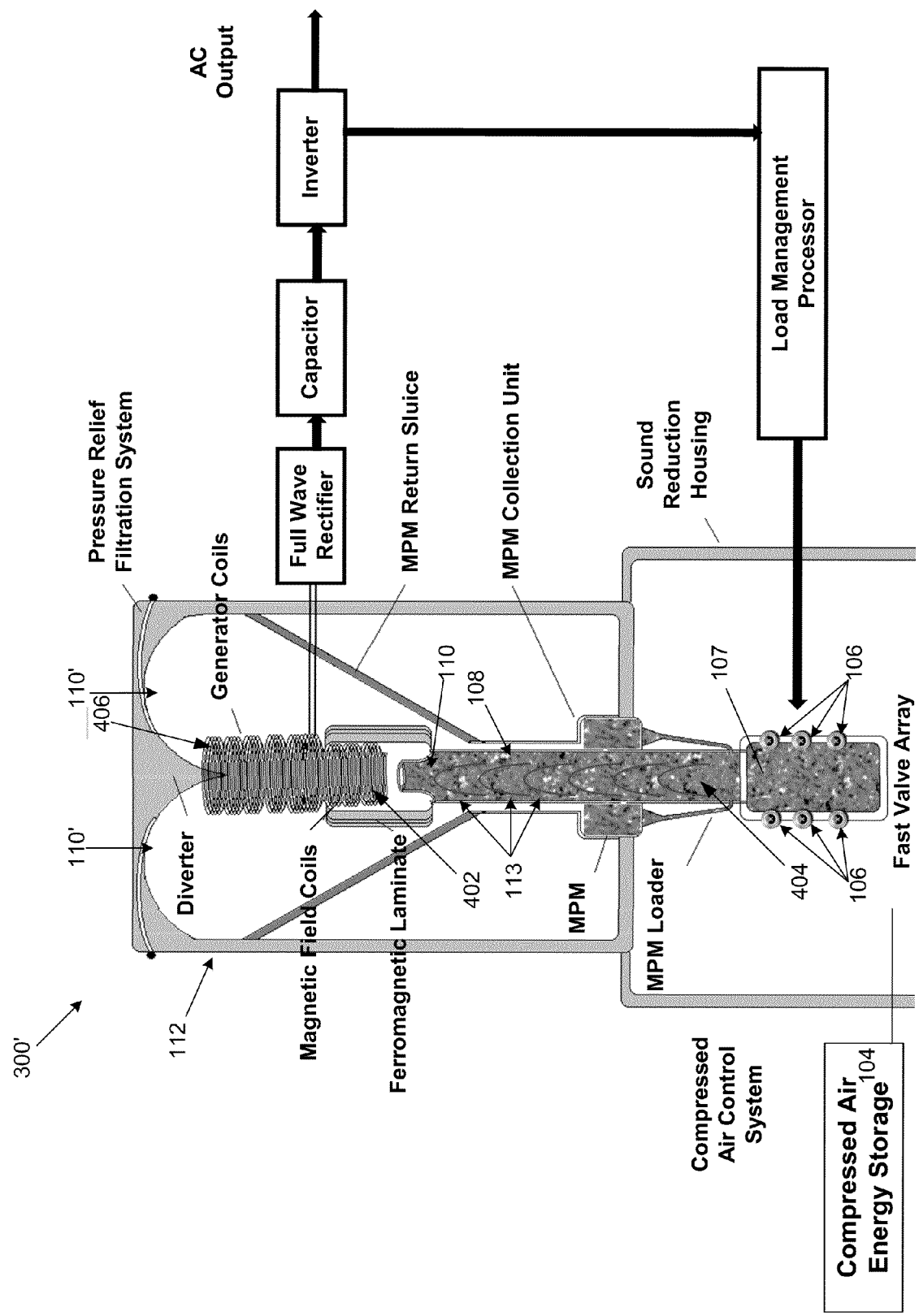

As shown in FIGS. 2A and 2B, this "plume" of temporarily magnetic MPM passes through a field coil 402 that aligns the dipole moment of each MPM particle, thereby creating a polarized magnetic "fluid" 404, which becomes a plume of magnetized material. This magnetic "fluid" 404 continues through a secondary coil 406 where an electromotive force is generated in accordance with Faraday's Law of Electromagnetic Induction. In some embodiments, the field coil 402 and secondary coil 406 are each a series of windings of an electrical wire about a central point. The secondary coil 406 may have more windings of coils than the field coils 402 according to some embodiments. Furthermore, in another embodiment there could be used an additional controller for the field coil 402 (not shown).

Nonetheless, a sinusoidal pulse of current is generated in the secondary coil (See FIG. 3) when the plume of magnetized MPM travels through and such pulse is directed through a rectifier to a capacitor to store the electrical energy produced.

It is noted that, in an embodiment where the launch tube requires a time interval to be "reloaded" with MPM, the voltage in the secondary coil is not generated continuously. However, it is within the scope of this application that a continuous voltage signal may be generated in the event that multiple launch tubes are employed where some launch tubes activate when other launch tubes are being reloaded. Additionally, a continuous reloading process is also contemplated in the present invention where MPM is continuously filling the launch tube and is continuously shooting MPM (either dielectric or magnetic MPM) through the generator.

Nonetheless, the MPM, as its kinetic energy is converted into electrical energy, slows and is captured by a venting system. From there, gravity allows the MPM to flow back into the supply hopper, as previously discussed. In addition, a positive feedback can be established by connecting the capacitor to the field coil, there by increasing the magnetization of the MPM. A helpful analogy to understanding this process is the common automotive alternator. Currently, the battery establishes a magnetic field in a series of coils inside the housing of the alternator. The rotor, spun by the engine's drive belt, moves through this field and produces a current that then flows back into the battery, thus raising the overall efficiency of the device.

Figure 4:
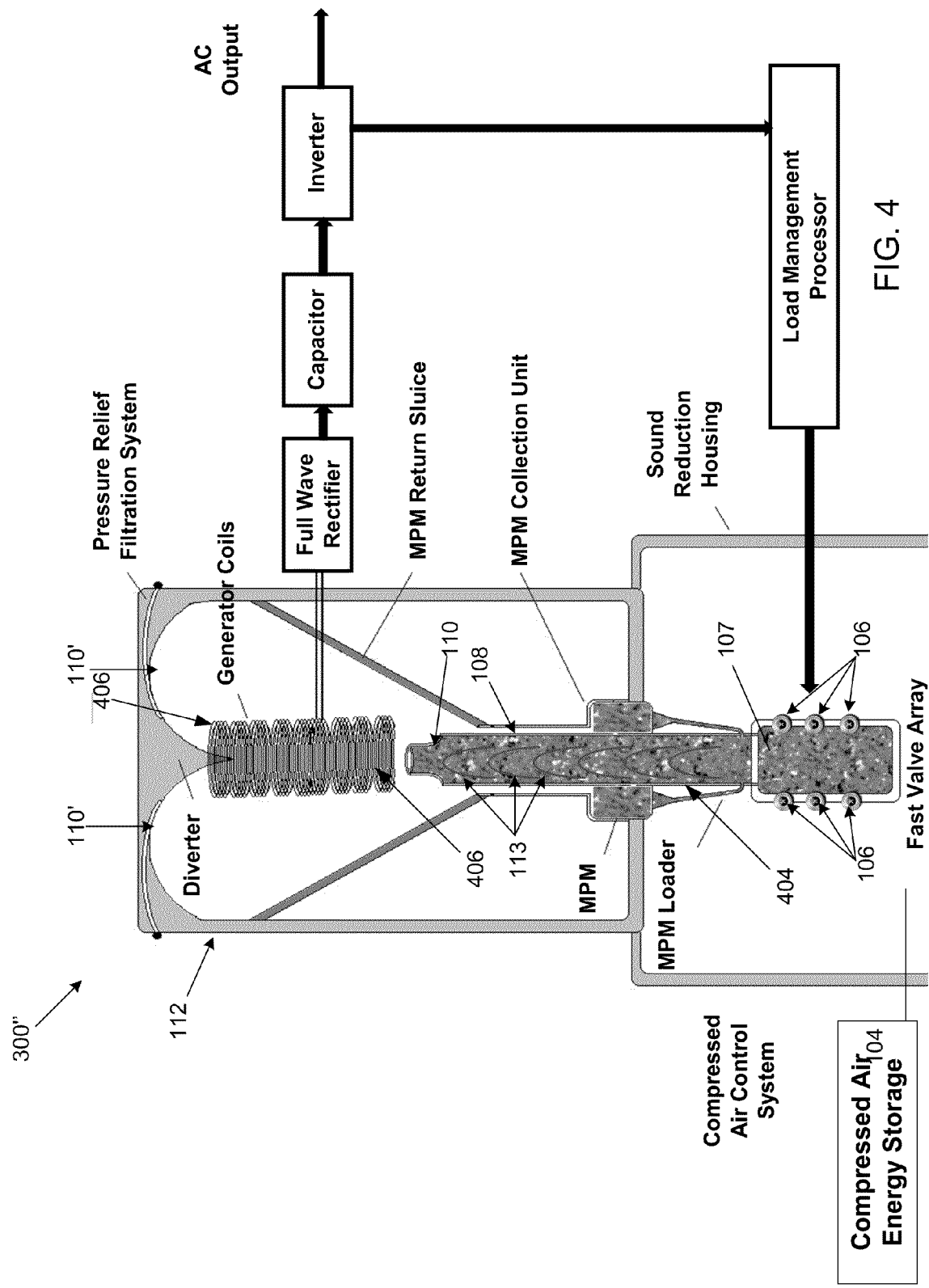
FIG. 4 is another example of a generator in accordance with some aspects.

In effect, the secondary coils become the generator of the system such that when the magnetized MPM enters the secondary coils, electrical current is generated and captured.
Generator Employing Permanent Magnetic MPM In another alternate embodiment illustrated in FIG. 4, a generator using a permanent-magnetic MPM (instead of or in addition to the temporary-magnetic MPM), may be employed as a generator 112 for the overall generator system 300. The permanent-magnetic MPM includes permanent magnet materials that generate a magnetic field. Using such permanent-magnetic MPM eliminates or minimizes the need for field coil 402 to magnetize the MPM plume. It is noted that the permanent-magnetic MPM may be used in combination with the temporary-magnetic material and does not have to be limited to homogenous magnetic materials.

Regardless, the generator 112 using a permanent-magnetic MPM operates the same as the above-described generator system using temporary-magnetic material except that the field coils are an optional portion of the system. For example, a plume of permanent-magnetic MPM is launched from the launch tube of the previously described systems and into the secondary coils 406 of FIG. 4 without traveling through the field coil. In one embodiment, the permanent-magnetic MPM plume travels through the field coil to magnetize any magnetizable material, as desired. As the permanent-magnetic MPM plume travels through the secondary coils 406, an electrical current is produced and electrical power is received and utilized or stored, as previously discussed.

Other embodiments of an electrical generator that uses MPM may be employed and the present application should not be limited by the embodiments disclosed herein.

For example, an AC/DC, DC/DC or DC/AC converter may capture electrical energy produced from the generator 112 as well as any energy and stores such energy in energy storage circuits. The energy storage circuits may be any circuit capable of storage energy, such as but not limited to, a battery, fuel cell, compressed air and any other means for storing electrical energy. In an application of the generator in a vehicle, DC energy will be produced and an up convertor will be used to convert to a higher DC voltage, a standard DC/DC. For other applications of the generator, AC may be required and a DC/AC convertor will be used. An example would be providing electricity to the power distribution grid requiring synchronization in both phase and frequency.

After electrical power is generated using any generator configuration, the electrical power may be stored, consumed or used in any manner using electrical circuitry.

Although specific embodiments have been illustrated and described herein, those of ordinary skill in the art appreciate that any arrangement which is calculated to achieve the same purpose may be substituted for the specific embodiments shown and that the disclosure has other applications in other environments. This application is intended to cover any adaptations or variations of the present disclosure. The following claims are in no way intended to limit the scope of the disclosure to the specific embodiments described herein.

What is claimed is:

1. An apparatus comprising:
   a launch tube configured to receive multiphase materials (MPM), wherein the MPM comprises a magnetic material having a magnetic field;
   a tank containing compressed gas;
   a gas delivery device to release the compressed gas into the launch tube; and
   a generator connected with the launch tube, the generator receiving the MPM when the gas delivery device releases the compressed gas into the launch tube to convert kinetic energy of the MPM into electrical energy, the generator comprising:
      a series of electrical coils to generate electrical current when the magnetic material of the MPM travels through the series of coils thereby inducing current to flow to and be used by an electrical load.

2. The apparatus of claim 1, wherein the MPM comprises a dielectric material.

3. The apparatus of claim 1, wherein the generator comprises at least one magnet comprising a north pole and a south pole.

4. The apparatus of claim 3, wherein the generator comprises a base, a first electrode and a second electrode, and wherein the north pole and the south pole are oriented at the base of the generator to direct MPM to first electrode and second electrode of the generator.

5. The apparatus of claim 1, further comprising:
   a member for delivering compressed gas to the launch tube; and
   a member for delivering the MPM to the launch tube.

6. The apparatus of claim 5, wherein the member for delivering compressed gas to the launch tube comprises fast acting valves that operate in a synchronized fashion to deliver the compressed gas to the launch tube when MPM is loaded into the launch tube.

7. The apparatus of claim 5, wherein the compressed gas comprises compressed air.

8. The apparatus of claim 1, wherein the MPM comprises a soft magnet material such that the soft magnetic material is allowed to be magnetized when exposed to a magnetic field.

9. The apparatus of claim 8, further comprising field coils to magnetize the soft magnet material when the soft magnet material is exposed to magnetic field generated by the field coils.

10. The apparatus of claim 9, further comprising secondary coils to generate electrical current when the soft magnet material travels through the secondary coils.

11. The apparatus of claim 1, wherein the MPM comprises a permanent magnet material.

12. The apparatus of claim 11, further comprising secondary coils to generate electrical current when the permanent magnet material travels through the secondary coils.

13. The apparatus of claim 1, wherein the MPM is moved through the launch tube and into the generator by introduction of compressed gas into the launch tube.

14. The apparatus of claim 1, wherein the launch tube comprises a first end, a second end and a container configured to hold the MPM and receive compressed air, the second end having an opening to the generator so that MPM can move from the launch tube to the generator.

15. An apparatus comprising:
   a launch tube configured to receive multiphase materials (MPM), wherein the MPM comprises a magnetic material capable of being magnetized;
   a tank containing compressed gas;
   a gas delivery device to release the compressed gas into the launch tube;
   field coils to magnetize the soft magnet material when the soft magnet material is exposed to magnetic field generated by the field coils; and
   a generator connected with the launch tube, the generator receiving the MPM when the gas delivery device releases the compressed gas into the launch tube to convert kinetic energy of the MPM into electrical energy, wherein the generator comprises:
      secondary coils that generate electrical power when the MPM travels proximate to the secondary coils.

16. The apparatus of claim 15, wherein the secondary coils comprises a coils of a conductive wire.

17. A method of generating electrical energy comprising:
   filling a launch tube with multiphase material (MPM) comprising magnetic material, the launch tube being connected with a storage tank of compressed air and a generator; and
   releasing the compressed air from the storage tank;

directing the released compressed air into the launch tube, thereby launching the MPM out of the launch tube through a series of electrical coils so that an electrical current is produced in the series of coils when the magnetic material of the MPM travels through the series of coils thereby inducing current flow receiving, at the generator, the current so that the generator may apply the current to a load.

18. The method of claim 17, wherein the generator comprises a magnet to direct the MPM to electrodes of the generator, the electrodes attracting ionized particles from the MPM when the MPM passes proximate to the electrodes.

19. The method of claim 17, wherein the generator comprises secondary coils that generate electrical current when the MPM travels proximate to the secondary coils.

20. The method of claim 19, wherein the MPM comprises soft magnetic material and wherein the generator further comprises field coils to magnetize the soft magnetic material prior to traveling proximate to the secondary coils.

21. The method of claim 19, wherein the MPM comprises permanent magnetic material.

* * * * *